United States Patent [19]
Hutchings et al.

[11] Patent Number: 5,283,015
[45] Date of Patent: Feb. 1, 1994

[54] METHOD FOR PRODUCING AMINE-FORMALDEHYDE MICROCAPSULES AND PHOTOSENSITIVE MICROCAPSULES PRODUCED THEREBY

[75] Inventors: David A. Hutchings, Centerville; Margaret T. Thomas, Kettering; William A. Hammann, IV, Miamisburg; Rong-Chang Liang, Centerville, all of Ohio

[73] Assignee: The Mead Corporation, Dayton, Ohio

[21] Appl. No.: 649,203

[22] Filed: Jan. 25, 1991

Related U.S. Application Data

[63] Continuation of Ser. No. 463,877, Jan. 5, 1990, abandoned, which is a continuation-in-part of Ser. No. 323,734, Mar. 15, 1989, abandoned.

[51] Int. Cl.$^5$ .......................... B01J 13/02; G03C 1/00
[52] U.S. Cl. .......................... 264/4.7; 264/4.1; 264/4.3; 430/138; 428/402.2; 428/402.21; 428/402.22; 503/214; 503/215
[58] Field of Search .............. 430/138; 428/402.2, 428/402.21, 402.22; 264/4.1, 4.3, 4.7; 503/214, 215

[56] References Cited

U.S. PATENT DOCUMENTS

| | | | |
|---|---|---|---|
| 4,145,184 | 3/1979 | Brain et al. | 264/4.7 |
| 4,353,809 | 10/1982 | Hoshi et al. | 252/316 |
| 4,608,330 | 8/1986 | Marabella | 430/138 |
| 4,642,281 | 2/1987 | Kakimi et al. | 430/138 |
| 4,775,656 | 10/1988 | Harada et al. | 430/138 |
| 4,778,781 | 10/1988 | Washizu et al. | 264/4.7 |
| 5,112,540 | 5/1990 | Chen et al. | 430/138 |

FOREIGN PATENT DOCUMENTS 34299 9/1974 Japan ..................... 264/4.7

OTHER PUBLICATIONS

Translation of JP49-34299.
Coover, Jr. et al. "Cyanoacrylate Adhesives", Handbook of Adhesives, 2d ed. pp. 569-580 (1976).

Primary Examiner—Christopher D. RoDee
Attorney, Agent, or Firm—Thompson, Hine and Flory

[57] ABSTRACT

A process for forming microcapsules having discrete capsule walls comprising the steps of:
  forming an emulsion of an oily core material phase in a continuous aqueous phase, said oily core material phase including isocyanatoacrylate or cyanoacrylate prewall reactants which react with said aqueous phase to form a pre-wall material around said oily core material phase; and
  enwrapping particles of said oily core material phase in an amine-formaldehyde condensation product produced by in situ condensation of an amine and formaldehyde, and the microcapsules produced thereby are disclosed.

12 Claims, 2 Drawing Sheets

METHOD FOR PRODUCING AMINE-FORMALDEHYDE MICROCAPSULES AND PHOTOSENSITIVE MICROCAPSULES PRODUCED THEREBY

This is a File Wrapper Continuation of co-pending application Ser. No. 463,877, filed Jan. 5, 1990, now abandoned which was a continuation-in-part of copending application Ser. No. 323,734, filed Mar. 15, 1989 now abandoned.

BACKGROUND OF THE INVENTION

1. Field of the Invention

The present invention relates to an improved method for producing microcapsules and, more particularly, to a method for producing microcapsules in which the wall is formed from a formaldehyde condensation product. While the method of the present invention is useful in producing microcapsules generally, microcapsules prepared in accordance with the present invention are particularly useful in photosensitive imaging materials of the type which employ a layer of microcapsules containing a radiation sensitive composition.

2. Brief Description of the Prior Art

Imaging materials employing photosensitive microcapsules are the subject of commonly assigned U.S. Pat. Nos. 4,399,209 and 4,440,836.

In the aforesaid commonly assigned U.S. patents, images are formed by image-wise exposing a layer of photosensitive capsules to actinic radiation and rupturing the capsules typically by passing the imaging sheet containing the capsules through a pressure nip. The radiation sensitive composition contains a photohardenable or photosoftenable material which undergoes a change in viscosity or modulus upon exposure. For example, in the most typical embodiments, the radiation sensitive composition contains a polyethylenically unsaturated monomer which polymerizes upon exposure, thereby causing the phase internal to the capsules to become harder. Due to the difference in the hardness of the capsules in the exposed versus the unexposed areas, only certain capsules rupture and release their contents. If the internal phase contains a dye precursor, the precursor is image-wise released, and a color image is formed upon its transfer to a developer layer. In previously disclosed embodiments, the developer layer may be present on the same support as the layer of capsules or a separate support.

As a microcapsule wall material, amine-formaldehyde polymers, and more particularly, melamine-formaldehyde polymers have been used to enwrap the photosensitive internal phase. For example, U.S. Pat. No. 4,608,330 discloses the encapsulation of photosensitive materials of the types described above in melamine-formaldehyde capsules. The process for preparing the microcapsules typically involves forming an emulsion of an oily internal phase composition in an aqueous phase, and enwrapping particles of the internal phase in a formaldehyde condensation product produced by in situ condensation of melamine and formaldehyde. This patent also discloses that a polyisocyanate may be added to the oily internal phase composition. As is described in greater detail in the patent, the presence of the isocyanate functions to form a prewall around the internal phase upon introduction into the aqueous phase as a result of the interfacial polycondensation polymerization reaction occurring between the isocyanate groups of the oily phase and the hydroxy groups of the aqueous phase.

Similarly, U.S. Pat. No. 4,353,809 discloses microcapsules with melamine-formaldehyde or ureaformaldehyde capsule shell walls. The reference also teaches the addition of a polyvalent isocyanate, a polyvalent isothiocyanate or a prepolymer thereof to the internal phase prior to addition to an emulsion to form a prewall material around the internal phase. The presence of the isocyanate, isothiocyanate, or prepolymer functions to stabilize the emulsion and enable the production of small diameter microcapsules.

Although the above microencapsulation processes have proven to be of great importance, they still suffer from one or more minor drawbacks.

For example, the prewall polycondensation reaction between the isocyanate groups and the hydroxy groups takes a relatively long time, and any reaction which occurs is confined to the oil-water interface. Due to the long prewall formation time period, the overall production of the microcapsules takes a relatively long time, and is cost inefficient. When trying to produce the microcapsules on a commercial scale, the cost expenditures associated with requiring the prewall materials to react to completion results in prohibitive costs.

When the internal phase of the microcapsules contains a photosensitive composition, other problems must be considered. In microcapsule imaging systems of the types described above, the photosensitive composition is extremely oxygen sensitive in that photopolymerization can only take place in its absence. Accordingly, the microcapsule walls must effectively functions as a barrier material to reduce permeation by oxygen. Further, the microcapsule walls should be as water resistant as possible. While the presence of water per se does not harm the photosensitive properties of the internal phase, water can plasticize the wall material and reduce the wall's barrier properties. As a result, if the barrier properties are broken down, the amount of oxygen diffusion will increase and, in turn, the photographic efficiency of the internal phase will significantly decrease. The above described prior art microcapsules, although able to generally form an effective barrier against oxygen and/or water, do not form a complete barrier.

A further problem associated with the microcapsules having a prewall formed by addition of a polyisocyanate to the aqueous phase is the potential presence of excess unpolymerized isocyanato groups. When polyisocyanates are added to an aqueous phase during emulsification, the polyisocyanates react with water to form a prewall at the oil-water interface. The product, a crosslinked polyurea polymer, is insoluble in both water and polyisocyanate, and the degree of swelling decreases as the crosslinking density increases. The polyurea polymer may eventually behave as a barrier that separates the two reactants and as such, prevents any further reaction from occurring after a layer of crosslinked prewall has been formed at the interface. Accordingly, under normal conditions, it is expected that some unreacted isocyanates will be present in the internal phase of the capsules. Upon exposure to moisture, the unreacted isocyanates will be converted to amines which may impede the efficiency of free radical photoinitiation, especially when compounds such as the cyanine dye/borate anion initiators as disclosed in U.S. Pat. No. 4,772,530 are used. In the cases where time, temperature, humidity and the concentration of unreacted amines are favorable to the formation of a network inside the capsules, a loss in image density may result.

Accordingly, there exists a need in the art for photosensitive microcapsules wherein the microcapsule walls are capable of forming rapidly, act as excellent oxygen and water barriers, are capable of providing an extended shelf life and do not interfere with the imaging chemistry of the internal phase.

SUMMARY OF THE INVENTION

In accordance with the present invention, microcapsules containing amine-formaldehyde shell walls are prepared by emulsifying an oily material internal phase in an aqueous medium and subsequently forming amine-formaldehyde walls around the internal phase by in situ polycondensation. The invention is particularly characterized by adding an isocyanatoacrylate or cyanoacrylate prewall reactant material into the internal phase. Presence of the prewall reactant material enables the production of microcapsules which may be prepared in a relatively short period of time, which have superior barrier properties against oxygen and water, which possess an extended shelf life, and which, when housing a photosensitive composition, are capable of producing highly contrasted images.

Accordingly, one embodiment of the present invention provides a process for producing microcapsules. The process comprises the steps of:
forming an emulsion of an oily core material phase in a continuous aqueous phase, said oily core material phase including an isocyanatoacrylate or cyanoacrylate prewall reactant which reacts with water from said aqueous phase to form a prewall material around said oily core material phase; and
enwrapping particles of said oily core material phase in an amine-formaldehyde condensation product produced by in situ condensation of an amine and formaldehyde.

The presence of the isocyanatoacrylate or cyanoacrylate prewall reactant material affords the microcapsules a number of benefits. First, the cyanoacrylate prewall former is capable of reacting much more rapidly with the aqueous phase to form a thick prewall around the internal phase than microcapsule formation processes which include polyisocyanates as the exclusive prewall former. Further, it is believed that the cyanoacrylate and isocyanatoacrylate materials react more completely than polyisocyanate prewall formers. This may extend the shelf life of the composition. Further, the thickness of the prewall surrounding the internal phase is thicker than that obtained by using a polyisocyanate as the sole prewall former. Accordingly, superior results in terms of oxygen and moisture protection are obtained. Moreover, despite the presence of a thicker prewall, the microcapsules may easily be ruptured by the application of pressure if not photohardened.

Moreover, it is hypothesized that by incorporating pendent acrylic functionality into the high molecular weight prewall reactant, photosensitivity may be improved. The same principle has been applied very successfully in conventional photopolymerization or photocrosslinking systems wherein film speed in general increases with increasing molecular weight and functionality of the reactants.

Although the inventive process is characterized by the presence of an isocyanatoacrylate or cyanoacrylate prewall reactant, it may be particularly desirable to add an amount of a polyisocyanate prewall reactant to the internal phase to optimize processing conditions and photographic properties of the produced microcapsules.

Another embodiment of the present invention provides a process for producing photosensitive microcapsules. The process comprises the steps of:
forming an emulsion of an oily core material phase including a photosensitive composition in a continuous aqueous phase, said oily core material including an isocyanatoacrylate reactant of the formula wherein $R^1$ is an alkyl, aryl, aralkyl or polyether group, $m = 1$, 2 or 3 and $n = 2$ or 3; and
enwrapping particles of said oily core material in a polyurea shell wall formed by the polycondensation of said isocyanatoacrylate reactant with water from said aqueous phase.

Another embodiment of the present invention resides in an imaging sheet comprising a support having on one surface thereof a layer of photosensitive microcapsules having discrete walls, the internal phase of the microcapsules including a radiation sensitive material and an isocyanatoacrylate or cyanoacrylate prewall reactant prior to wall formation, wherein the microcapsules are formed by the above described process.

Accordingly, it is an object of the present invention to provide a process for producing microcapsules wherein the process may be performed in a relatively short period of time.

It is another object of the present invention to provide photosensitive microcapsules having improved barrier properties against oxygen and water, having an improved shelf life, and having improved photographic properties.

These, and other objects, will be readily understood by one skilled in the art as reference is made to the following detailed description of the preferred embodiment.

DETAILED DESCRIPTION OF THE PREFERRED EMBODIMENT

In describing the preferred embodiments, certain terminology will be utilized for the sake of clarity. The use of such terminology encompasses not only the recited embodiments, but all technical equivalents which perform substantially the same function in substantially the same way to produce the same result.

According to the preferred embodiment, an improved method for producing amine-formaldehyde microcapsules, i.e., melamine-formaldehyde or urea-formaldehyde microcapsules is provided. The method includes the steps of forming an emulsion of an oily core material phase in a continuous aqueous phase and enwrapping the particles of the oily core material phase in amine-formaldehyde walls produced by in situ condensation of an amine and formaldehyde. The invention is particularly characterized by the presence of an isocyanatoacrylate or cyanoacrylate prewall reactant in the oily core material phase which, upon dispersion in the continuous aqueous phase, reacts with the water and other nucleophiles present in the aqueous phase at the interface of the droplets of the oily internal phase to form a pre-wall around the internal phase. The presence of the pre-wall functions to enable the production of microcapsules which have superior properties in terms of stability and oxygen and water impermeability.

The microcapsules produced in accordance with the present invention may be used for a number of different practical applications such as in agricultural chemicals, medicines, perfumes, chemicals, adhesives, liquid crystals, detergents, dyes, dye precursors, developers, catalysts, rust preventing agents and photographic materials. It is particularly preferred to use the microcapsules as photographic materials, and still more particularly, in microencapsulated imaging systems such as those described in U.S. Pat. Nos. 4,399,209 and 4,440,836.

To initiate the process of the present invention, an aqueous phase is provided. The aqueous phase serves as the continuous phase of an oil-in-water emulsion in which the oily core material phase is dispersed.

The aqueous phase preferably includes agents known as emulsifiers and system modifiers to control the size and uniformity of the microcapsules and to produce individual mononuclear capsules in preference to clusters of microcapsules. Useful emulsifiers and system modifiers are well known in the art. Their selection will depend on the type of microencapsulation process used and the nature of the wall formers. For making melamine-formaldehyde microcapsules a combination of methylated polygalacturonic acid and sulfonated polystyrenes is preferred. The polygalacturonic acid acts as both a stabilizer and a viscosity modifier for the aqueous phase, and the sulfonated polystyrenes aid in emulsification.

Methylated polygalacturonic acids having a methylation degree greater than 50% are generally available. The preferred polygalacturonic acids have a methylation degree between 40 and 70% and still more preferably between 55 and 65%. However, acids having a methylation degree less than 40% or greater than 70% are also believed to be useful.

The most typical examples of useful acids are commonly known as pectins. Since pectin is a naturally occurring product, its composition will vary with the season and the source from which it is derived. As a result of this variation, some pectins will provide better microcapsules than others. Methylated polygalacturonic acid is generally added to the aqueous phase in an amount of about 1.0 to 8% based on the amount of water in the aqueous phase, with the preferred amount being about 2 to 4%.

Typical examples of sulfonated polystyrenes useful in the present invention are Versa TL500 and Versa TL503, products of National Starch Co. Useful sulfonated polystyrenes are generally characterized by a sulfonation degree of over 85% and preferably over 95%. The molecular weight of the sulfonated polystyrene is preferably greater than 100,000 and more preferably about 500,000–1,000,000 but other molecular weights can also be used. The sulfonated polystyrene is usually added to the aqueous phase in an amount of about 1 to 6% by weight. The quality of this product has also been found to vary with the method by which it is manufactured such that certain sulfonated polystyrenes are better than others.

Once the aqueous phase has been prepared, the oily core material phase, including the isocyanatoacrylates or cyanoacrylates prewall reactant, and optionally, other polyisocyanates, is dispersed in the aqueous phase.

A primary constituent of the oily core material internal phase is an organic, water-immiscible liquid. Liquids which can be encapsulated by the process of this invention include natural mineral oil, animal oil, vegetable oil and synthetic oil. Examples of such mineral oils are petroleum and its fractions such as kerosine, gasoline, naphtha and paraffin oil. Examples of animal oils are fish oil and lard. Examples of vegetable oils are groundnut oil, linseed oil, castor oil and corn oil. Examples of synthetic oils are a biphenyl compound (e.g., isopropylbiphenyl and isoamylbiphenyl), a terphenyl compound (e.g., compounds described in German Patent Application (OLS) No. 2,153,635), a phosphoric acid compound (e.g., triphenyl phosphate), a naphthalene compound (e.g., compounds described in German Patent Application (OLS) No. 2,141,194), a methane compound (e.g., compounds described in German Patent Application (OLS) No. 2,153,634), a phthalic acid compound (e.g., diethyl phthalate, dibutyl phthalate, dioctyl phthalate), and a salicylic acid compound (e.g., ethyl salicylate).

In the preferred embodiment, the water-immiscible liquid takes the form of a photosoftenable or photohardenable radiation sensitive composition and the composition is used as part of a photographic imaging system. Photohardenable compositions such as photopolymerizable and photocrosslinkable materials increase in viscosity or rigidity upon exposure to radiation and yield positive images.

Ethylenically unsaturated organic compounds are useful radiation curable materials. These compounds contain at least one terminal ethylene group per molecule. Typically, they are liquid. Polyethylenically unsaturated compounds having two or more terminal ethylene groups per molecule are preferred. An example of this preferred subgroup is ethylenically unsaturated acid esters of polyhydric alcohols, such as trimethylol propane triacrylate (TMPTA) and dipentaerythritol hydroxypentaacrylate (DPHPA).

The internal phase also typically includes a photoinitiator. A preferred photoinitiator system for use in the present invention includes reactive ionic dye-counter ion complexes described in U.S. Pat. Nos. 4,771,530 and 4,771,541. A preferred class of ionic dye-counter ions is cationic dye borates and still more particularly cyanine dye borates. Typically the borate is a triphenylalkyl borate such as a triphenylbutyl borate. Other dye complexes such as Rose Bengal iodonium and Rose Bengal pyryllium complexes may also be used.

Examples of other photoinitiators useful in the present invention include diaryl ketone derivatives, quinones and benzoin alkyl ethers. Where ultraviolet sensitivity is desired, suitable photoinitiators include alkoxy phenyl ketones, O-acylated oximinoketones, polycyclic quinones, phenanthrenequinone, naphthoquinone, diisopropylphenanthrenequinone, benzophenones and substituted benzophenones, xanthones, thioxanthones, halogenated compounds such as chlorosulfonyl and chloromethyl polynuclear aromatic compounds, chlorosulfonyl and chloromethyl heterocyclic compounds, chlorosulfonyl and chloromethyl benzophenones and fluorenones and haloalkanes. In many cases it is advantageous to use a combination of photoinitiators. The photoinitiator is typically added in an amount of about 0.05 to 10 parts per 100 parts of internal phase.

To improve the film speed of the photohardenable composition it may be advantageous to include an autoxidizer and/or other additive material in the photohardenable composition. An autoxidizer is a compound which is capable of consuming oxygen in a free radical chain process.

Examples of useful autoxidizers are N,Ndialkylanilines. Particularly preferred N,N-dialkylanilines are substituted with an alkyl group in the ortho-position and include 2,6-diisopropyl-N,N-dimethylaniline, 2,6-diethyl-N,N-dimethylaniline, N,N,2,4,6-pentamethylaniline and p-t-butyl-N,Ndimethylaniline.

It may also be desirable to utilize an additional material to improve the photosensitive properties of the photohardenable composition such as film speed. Examples of these compounds include thiols such as acylthiohydroxamates, 2-mercapto-ben2othiazole, 6-ethoxy-2-mercaptobenzothiazole, 2-mercaptobenzoxazole, phenylmercaptotetrazole, and heptylmercaptotriazole. Disulfides of the above listed thiol compounds are also useful additives.

The autoxidizers and/or additive compounds are preferably used in the present invention in concentrations of about 0.1 to 10 parts per 100 parts of the photohardenable composition.

The internal phase also includes a cyanoacrylate or isocyanatoacrylate prewall reactant. The prewall reactant rapidly reacts with the water and other nucleophiles present in the aqueous phase at the surface of the internal phase droplet interface to form a prewall around the internal phase droplets. The cyanoacrylate or isocyanatoacrylate is typically added in an amount of about 1 to 25 parts per 100 parts internal phase.

When a cyanoacrylate pre-wall reactant is selected, it is preferably of formula (I)

(I)

where R is an alkyl group, an alkenyl group, an alkynl group, an aryl group, an aralkyl group or a group of the formula (II)

(II)

where $R^3$ is a straight or branched chain alkylene group having 1 to 10 carbon atoms and $R^4$ is an alkyl group, an alkenyl group, an alkynl group, an aryl group, an aralkyl group, an acryloyl group, a methacryloyl group, a cyanoacryloyl group or $R^4$ is a moiety containing 2 to 4 isocyanato groups; and $R^1$ and $R^2$ may be the same or different and each represent a hydrogen atom, an alkyl group having 1 to 10 carbon atoms, a 2-furyl group, a 2-thienyl group, or a 3-thienyl group; and M is 1, 2 or 3.

Examples of alkyl groups represented by R include methyl, ethyl, propyl, etc.; examples of alkenyl groups include butenyl, propenyl, and 1,3-pentadienyl; examples of alkynl groups include propynl and isobutynl.

Cyanoacrylates may be prepared by reacting cyanoacetic acid with a diol to yield a hydroxyester. The hydroxyester is reacted with an acid chloride or an acid anhydride in the presence of sulfuric acid to yield a compound of the formula (III)

(III)

where $R^3$ and $R^4$ are defined as above. This compound is reacted with a ketone of the formula (IV)

(IV)

in the presence of ammonium acetate and toluene to yield the compound of formula (I) where R is defined as in formula (II). The BIS cyanoacrylate can be synthesized from cyanoacetic acid and a diol to yield the compound (V)

(V)

which is subsequently reacted with a ketone to yield the biscyanoacrylate. Alternatively, cyanoacrylates can be synthesized by the procedures described in the literature, for example, U.S. Pat. Nos. 3,850,960; 4,012,402; 3,975,422; 4,003,942; 4,013,703; 4,041,061; 4,041,062; 4,041,063; and Japan published application 80.100351. A review of the synthesis of biscyanoacrylates is given in G. H. Millet, "Structural Adhesives," S. R. Hartshorn Ed., Ch. 6, p. 542 (1986), Plenum Press.

Examples of other cyanoacrylates which may be used in the present invention are set forth in U.S. Pat. Nos. 2,721,858; 2,794,788; 2,763,585; 3,221,745; and 2,753,251. Also contemplated within the scope of the present invention are other activated acrylates wherein the cyano group is replaced by other reactive groups such as trifluoromethyl, aldehyde, ketone, ester, carboxyl, nitromethyl and phenyl groups.

When an isocyanatoacrylate pre-wall reactant is selected, it is preferably of formula (VI)

(VI)

wherein $R^1$ is an alkylene group, an arylene group, an arylenealkylene group or a polyether group and m and n independently represent 1, 2 or 3. Examples of suitable isocyanatoacrylates of formula (VI) include isocyanatoethylacrylate, isocyanatoethylmethacrylate, and a condensate of 2-hydroxyethyl(meth)acrylate with a polyisocyanate.

When the isocyanatoacrylate is added to the aqueous phase, a polycondensation reaction occurs between the isocyanato groups and the water from the aqueous phase to form a primary amine having acrylic functionality. In the presence of other polyisocyanates, a polyurea network with acrylic functional groups attached to it is formed at the interface. When n=1 a polyisocyanate must be present in the internal phase to form the polyurea network. However, if n=2 or 3, the isocyanatoacrylate additive alone may react with water to form a polyurea network. In fact, in these instances, the thickness and barrier properties of the walls are sufficient enough to enable the microcapsules to be shelf stable for extended periods of time. While it is preferred to further enwrap the microcapsules in an amineformaldehyde condensation product to provide additional barrier protection, it is not required.

The internal phase preferably also includes a diisocyanate or polyisocyanate compound in addition to the cyanoacrylate or isocyanatoacrylate prewall reactant. As is known in the art, the polyisocyanate compound is capable of reacting with the water from the aqueous phase by polycondensation to form a thin layer of a polyurea polymer around the internal phase. A particularly preferred polyisocyanate is Desmodur N-100, a bioret of hexamethylene diisocyanate and water available from Mobay Chemical Company. Other isocyanates, such as SF-50, manufactured by union Union Carbide may be used in this invention. The polyisocyanate is typically added in an amount of about 2 to 15 parts per 100 parts of internal phase.

If, as is preferred, the polyisocyanate compound is used in combination with the cyanoacrylate prewall reactant, when the combination is added to the aqueous phase, the resulting wall material comprises an interpenetrating polymer network wherein the network includes a polycyanoacrylate polymer which is interpenetrated by a polyurea polymer. The resulting material has both high resilience because of the presence of the polyurea polymer and high strength because of the presence of the polycyanoacrylate polymer.

When the polyisocyanate compound is used in combination with the isocyanatoacrylate prewall reactant, the resulting prewall material comprises a polyurea polymer. Further, the in situ formation of a low molecular weight primary amine at the interface improves the conversion of isocyanate groups. This polymer differs from that obtained by the reaction of a polyisocyanate compound with water in that a number of terminal amino groups are replaced with acrylate groups. As will be discussed in greater detail later, when the internal phase contains a photohardenable imaging compound, the presence of acrylate groups instead of amino groups in the prewall leads to a microcapsule having superior photographic properties.

The internal phase may also include a catalyst for improving the rate of prewall reaction. Examples of catalysts include dibutyl tin dilaurate or diacetate. Alternatively, the catalysts may be included in the aqueous phase.

The internal phase composition may also include an image-forming agent. Various color-forming agents can be used in the internal phase. For example, images can be formed by the interaction of color formers and color developers of the type conventionally used in the carbonless paper art. In addition, images can be formed by the color producing interaction of a chelating agent and a metal salt or by the reaction of certain oxidation-reduction reaction pairs, many of which have been investigated for use in pressure-sensitive carbonless papers.

Typical color-forming agents useful in the aforesaid embodiments include colorless electron donating type compounds. Representative examples of such color formers include substantially colorless compounds having in their partial skeleton a lactone, a lactam, a sulfone, a spiropyran, an ester or an amido structure such as triarylmethane compounds, bisphenylmethane compounds, xanthene compounds, fluorans, thiazine compounds, spiropyran compounds and the like. Cyan, magenta and yellow color precursors useful in the present invention are commercially available.

Once the internal phase has been dispersed in the aqueous phase, the emulsion is emulsified until an average droplet diameter ranging from about 2.5 to about 10 microns is produced. The preferred pH for the prewall formation step is between 6-9, and more preferably, between 7.5 and 8.5. This is typically accomplished by utilizing agitation means such as stirrers and blenders.

Blending is continued until most of the prewall reaction has ceased, whereupon solutions of the amine, typically urea, melamine, dimethylol urea and the like, and formaldehyde or a solution of a precondensate thereof are/is added to the emulsion. Depending upon the type of microcapsule walls to be formed, the pH of the emulsion is adjusted appropriately. For example, a pH of about 4.0 is useful in making urea-formaldehyde microcapsules whereas a pH of about 6.0 is used in making melamine-formaldehyde capsules. The capsule walls gradually form around the internal phase by in situ condensation of the amine with the formaldehyde. The condensation product can be modified by the co-condensation of a polyhydric phenol such as resorcinol if desired.

Among many well known encapsulation techniques that can be used in the present invention are: Kiritani et al., U.S. Pat. No. 3,796,669 for urea-resorcinol-formaldehyde capsules; Forris et al., U.S. Pat. Nos. 4,001,140; 4,087,376 and 4,089,802 for melamine-formaldehyde capsules. On reaction, any amine-formaldehyde condensate separates from the solution which wets and enwraps the capsule core material. After the walls have been solidified, the capsules may be separated from the medium and washed.

One method in accordance with the present invention for conducting the in situ condensation reaction involves the following steps:
  (i) Adding amine and formaldehyde or amineformaldehyde precondensate to the agitated emulsion
  (ii) Adjusting pH to acidic conditions
  (iii) Polymerizing the amine and formaldehyde while stirring the system
  (iv) Heating
  (v) Reacting the excess formaldehyde with an excess of amine.

To prepare microcapsules having melamineformaldehyde walls, the following procedure can be used:
  (i) Adding melamine-formaldehyde precondensate to the system
  (ii) Adjusting pH to acidic conditions
  (iii) Polymerizing precondensate
  (iv) Heating
  (v) Reacting excess formaldehyde with an excess of amine.

Another process involves the following sequence of steps:
  (i) Adding an aqueous solution of urea to the emulsion
  (ii) Adding an aqueous solution of resorcinol to the emulsion
  (iii) Adding an aqueous solution of formaldehyde to the emulsion
  (iv) Heating to 65° C.
  (v) Adjusting the pH to 9.0
  (vi) Adding a solution of sodium bisulfite to scavenge excess formaldehyde
  (vii) Removing an aqueous dispersion of the microcapsules.

The condensation reaction proceeds under acid conditions, e.g., pH of 7 or less; however, the reaction is preferably carried out at a pH in the range of 2.5 to 6.0. The temperature of the encapsulation medium should be maintained at about 10° to 90° C., preferably about 25° to 85° C. and more preferably about 45° to 75° C.

Among the acid catalysts that may be used are low molecular weight carboxylic acids, e.g., formic acid, oxalic acid, acetic acid, etc.; inorganic acids, e.g., sulfuric acid, hydrochloric acid, phosphoric acid, etc.; and acidic or easily hydrolyzable salts such as aluminum sulfate, ammonium nitrate, ammonium chloride, ammonium sulfate, etc. Ammonium salts are preferred as they seem to provide a stronger and less permeable capsule. If urea-formaldehyde capsule walls are produced, the ammonium salts are usually employed in an amount of about 2 to 20% by weight based on the amount of urea.

The amine and formaldehyde are preferably present in the encapsulation medium, whether as the free monomer or a precondensate, in a molar ratio of formaldehyde to amine of at least 1.5 and preferably about 2.0 to 3.0.

To reduce malodor and the incidence of skin irritation, when the polymerization reaction is complete, it is desirable to remove or react the excess formaldehyde. This can be accomplished by using any one of several known techniques such as the addition of urea, sulfite, bisulfite, ammonium salts, 2-imidazolidone, ethylene-n-methylolacrylamide-vinylacetate copolymer, defatted soybean powder, isobutylene/maleic anhydride copolymer/ammonium salt, 5-methylbenzimidazole, dimethyloldihydroxyethyleneurea, carbohydrazide, water insoluble amino group containing polymers such as Amberlite IR45, 2-oxazolidone and dihydroxyacetone (dimer form). These materials react with the formaldehyde to form a product which does not interfere with the performance of the medium. The addition of the urea or sodium bisulfite to scavenge formaldehyde is preferably performed in a single step after encapsulation and prior to storage. The pH and temperature of the medium should be adjusted for this reaction. The bisulfite is preferably reacted at a pH of 6 to 9 from room temperature to 85° C. for about two hours. The urea can be reacted at a pH of 3.8 to 9 at a temperature of 20°-85° C. for about 40 minutes.

The mean microcapsule size used in the present invention generally ranges from about 1 to 25 microns.

To produce an imaging sheet capable of providing images, the inventive photosensitive microcapsules are coated onto a substrate. The most common substrate for imaging sheets in accordance with this invention is a transparent film or paper. Transparent substrates such as polyethylene terephthalate and translucent substrates can also be used in this invention. Another preferred substrate for the microcapsules is aluminized polyethylene terephthalate. The microcapsules can be located on either the top or bottom surface of a transparent substrate to form an imaging sheet.

To form an image, the inventive substrate is exposed to actinic radiation such that the microcapsules are image-wise exposed. Typically, exposure of the microcapsules to actinic radiation (ultraviolet, visible or infrared wavelengths) causes the internal phase of the microcapsules to polymerize, thereby preventing escape of the image-forming agent from the imaging sheet. Thereafter, the microcapsules on the imaging sheet are subjected to a uniform rupturing force in the presence of a developer material to form the images.

When the image-forming agent is a colorless color-forming agent, it is necessary that the developer sheet include a developer material which is capable of reacting with the color-forming agent to form an image. Illustrative examples of color developers useful in conjunction with the embodiment employing the aforesaid color precursors are clay minerals such as acid clay, active clay, attapulgite, etc.; organic acids such as tannic acid, gallic acid, propyl gallate, etc.; acid polymers such as phenol-formaldehyde resins, phenol acetylene condensation resins, condensates between an organic carboxylic acid having at least one hydroxy group and formaldehyde, etc.; metal salts or aromatic carboxylic acids such as zinc salicylate, tin salicylate, zinc 2-hydroxynaphthoate, zinc 3,5-di-tert-butyl salicylate, oil soluble metal salts or phenol-formaldehyde novolak resins (e.g., see U.S. Pat. Nos. 3,672,935; 3,732,120 and 3,737,410) such as zinc modified oil soluble phenol-formaldehyde resin as disclosed in U.S. Pat. No. 3,732,120 zinc carbonate etc. and mixtures thereof. A preferred class of glossable developers is described in commonly assigned U.S. application Ser. No. 073,036, filed Jul. 14, 1987.

The present invention may be utilized to produce monochromatic or full color images. Full-color imaging systems are described in U.S. Pat. No. 4,576,891, European Published Application No. 0223587 and U.K. Patent No. 2,113,860. These systems employ imaging sheets having three sets of microcapsules which respectively contain cyan, magenta and yellow color precursors. As explained in more detail in the above-listed references, each set of microcapsules is primarily sensitive in a different wavelength band such that the microcapsules can be individually exposed with minimum cross-talk. In panchromatic systems, the cyan, magenta, and yellow forming photosensitive microcapsules are respectively sensitive to red, green and blue light.

To produce full-color images, each set of microcapsules is image-wise exposed to actinic radiation. This requires exposures of three different wavelengths, each wavelength corresponding to the sensitivity of the photohardenable composition selected for the corresponding set of microcapsules. The three different wavelengths may be provided from one broad band radiation source or three independent monochromatic radiation sources.

After exposure, the substrate is brought into contact with a developer material, and the microcapsules are ruptured in the presence of the developer material to produce a full color image.

When used in photographic imaging systems, the microcapsules of the present invention afford a number of advantages. First, the reaction time of the cyanoacrylate or isocyanatoacrylate prewall reactant with water from the aqueous phase to form a thick prewall is shortened. In the case where a cyanoacrylate prewall reactant is used, its prewall formation is not a diffusion-controlled reaction, but rather, an ionic polymerization. It is hypothesized that ionic polymerization, as opposed to diffusion controlled polycondensation, enables chain propagation through the interface and rapid formation of a thick prewall to occur. This improves the rate of production of the microcapsules and makes their production more feasible from a commercial standpoint. Further, the amount of residual isocyanate after reaction is maintained at a minimum. As discussed above, this results in a better shelf life and image quality for the microcapsules.

Further, the prewalls formed by utilizing the cyanoacrylate or isocyanatoacrylate prewall reactant are superior barrier materials against oxygen and water. In photoimaging systems, the presence of these materials, and particularly oxygen, can significantly reduce the efficiency of photoinitiation. Therefore, it is critical that either or both the primary wall and the prewall function to effectively prevent diffusion of oxygen into the internal phase. The prewalls according to the present invention are thicker, and, in the case of the prewalls formed by using a cyanoacrylate prewall former, the presence of the nitrile groups from the prewall former further improves the barrier properties and stability of the microcapsules. Conversely, the prewalls may not be so thick as to prevent complete rupture upon the application of pressure to the microcapsules.

Moreover, due to the excellent barrier properties of the prewalls of the present invention, the resulting capsules are resistant to oxygen and water over extended periods of time, thereby extending the shelf life of the microcapsules. The resistance against oxygen permeation at high humidity reduces the risk of the microcapsules to reciprocity failure due to low intensity exposures. This type of reciprocity failure is caused by the diffusion of oxygen into the internal phase which prevents the composition from fully polymerizing upon low intensity exposures.

A further advantage of the microcapsules of the present invention is that the prewalls do not have an excess number of free terminal primary amine groups caused by reaction of residual isocyanate groups with water. As discussed above, it is hypothesized that the presence of excess primary amines in the internal phase can prevent the composition from achieving a minimum image density. Accordingly, by maintaining the amount of primary amines at a minimum, image density can be improved.

In addition, the terminal acrylate portion of the prewall reactant may, to some extent, polymerize upon exposure to actinic radiation. This phenomenon particularly occurs when Utilizing an unsaturated isocyanatoacrylate prewall reactant. This enables the photosensitive monomer to react directly with the prewall and thereby improve the speed of the microcapsules.

The present invention is illustrated in more detail by the following non-limiting examples.

SYNTHESIS EXAMPLE 1

As a control, the following internal phase was escapsulated in melamine formaldehyde microcapsules using the following procedure.

| | |
|---|---|
| Trimethylolpropane triacylate (TMPTA) | 105 grams |
| Dipentaerythritol hydroxpentaacrylate (DPHPA) | 45 grams |
| 2,6-di-tert-butyl-4-methylphenol (BHT) | 0.0375 grams |
| Cyan color former (Hilton Davis HD 5430) | 18 grams |
| 1,1'-di-n-heptyl-3,3,3',3'-tetra-methylindocarbocyanine triphenyl-n-butyl borate (photoinitiator) | 1.2 grams |
| 2,6-diisopropyl-n,n-dimethylaniline (DIDMA) | 0.5 grams |
| Desmodur N-100 Polyisocyantes (N-100) | 10 grams |

A. Preparation of Internal Phase

1. Add TMPTA, DPHPA and BHT to a beaker and heat while stirring to about 105° C. for about 30 minutes;
2. Slowly stir HD-5430 into beaker;
3. Stir at 105° C. for 30 minutes;
4. Cool to 70° C. gradually (about one hour);
5. Add photoinitiator;
6. Stir at 70° C. for 30 minutes;
7. Add DIDMA to beaker;
8. Add N-100 to beaker;
9. Stir 5 minutes with hot plate set at 70° C.

B. Preparation of External Phase

1. Add 430.0 grams water to a 1200 ml stainless steel beaker and stir with an overhead mixer at 500 rpm with 6 bladed impeller (45° C. pitch);
2. Cover beaker with foil and slowing sift in 8.0 grams Versa TL-502B;
3. Stir for 15 minutes at 500 rpm;
4. Mix 12.65 grams pectin with 0.24 grams sodium bicarbonate, increase stir rate in beaker to 1500 rpm, add mixture to beaker and stir for two hours at 1500 rpm;
5. Adjust ph-to 6.0 with 104 NAOH;
6. Stir at 3000 rpm for 10 minutes.

C. Emulsification of Internal phase in External Phase

1. Slowly add internal phase to external phase over a period of about 30 seconds;
2. Emulsify at 3000 rpm for 15 minutes.

D. Formation of Melamine Formaldehyde Exterior Walls

1. Add 198.9 grams of water into a glass beaker and stir;
2. Slowly add 17.7 grams of melamine into the beaker;
3. Slowly add 29.4 grams of 37% formaldehyde into the beaker and cover with foil;
4. Heat the beaker to 60° C. over a period of 30 minutes and cure for 60 minutes at 60° C.;
5. Reduce agitation rate of emulsification to 1500 rpm;
6. Pour melamine-formaldehyde precondensate into emulsion;
7. Adjust pH to 6.0 by adding $H_3PO_4$;
8. Cover beaker with foil and insert into a 70° C.
9. Cure for 60 minutes;
10. Add 46.2 grams of 50% by weight aqueous urea solution;
11. Cure for 40 minutes;
12. Reduce agitation rate to 500 rpm and add 15 grams of 10% by weight NAOH;
13. Cool to room temperature by stirring overnight at 500 rpm;
14. Isolate capsules.

SYNTHESIS EXAMPLE 2

The identical internal phase was escapsulated according to Synthesis Example 1 with the exception that 10 grams of Superglue cyanoacrylate was added to the internal phase directly after the addition of N-100 and subsequent stirring step.

EXAMPLE 1

A microcapsule formulation was produced by combining the following compositions:

| | |
|---|---|
| Synthesis Example 1 Microcapsules | 92.8% |
| Dow Add 25/Triton X-100 Surfactant Solution | 5.2% |
| Polyvinyl alcohol (PVA205) | 2.0% |

The formulation contained 18% solids and was coated onto an aluminized polyethylene terephthalate sheet. The following tests were performed on the microcapsules using a step (a) Reciprocity behavior from 4 to 256 seconds at 35° C.-85% relatively humidity (b) Temperature performance from 20° C. to 70° C. at 0.5 second exposures on scanning sensitometer (c) Accelerated aging at 105° C. for 0 and 24 hours.

Figure 1:
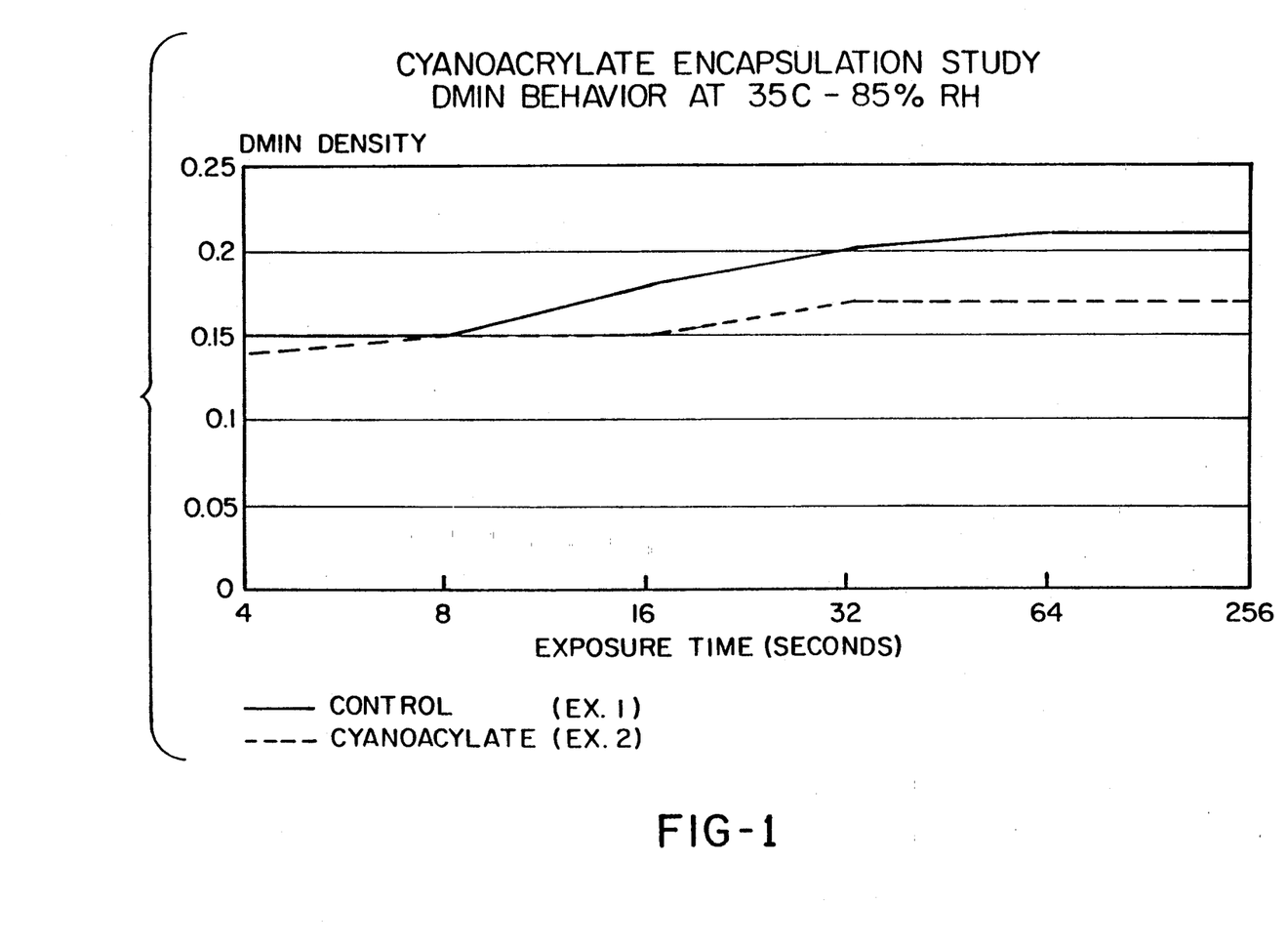
FIG. 1 depicts Dmin behavior at 35° C.-85% Relative Humidity for Examples 1 and 2.
Figure 2:
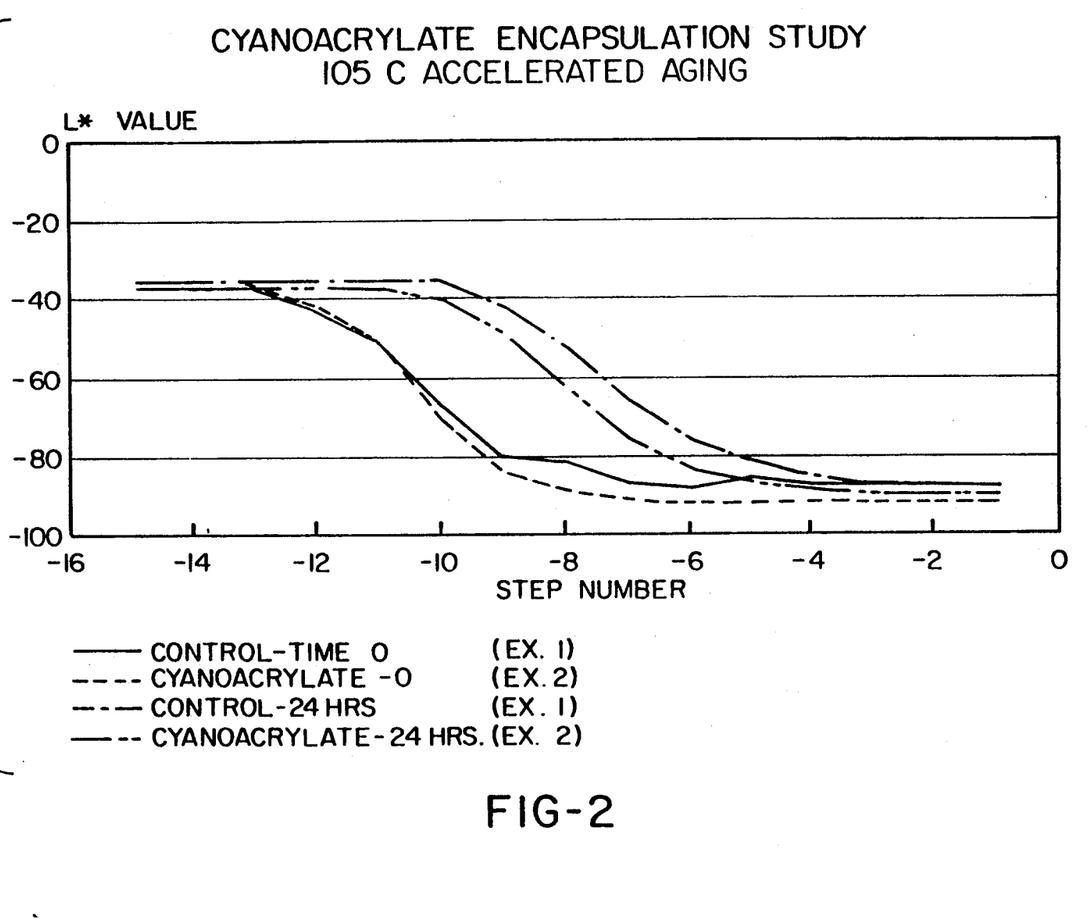
FIG. 2 depicts H & D curves for Examples 1 and 2 before and after subjecting the microcapsules to accelerated aging conditions.

The results of tests (a) and (c) are pictorally represented in FIGS. 1 and 2.

EXAMPLE 2

The tests of Example 1 were repeated except that the microcapsules of Synthesis Example 2 were substituted for the microcapsules of Synthesis Example 1. The results of tests (a) and (c) are pictorally represented in FIGS. 1 and 2. With respect to test (b), the microcapsules exhibited superior performance at 50° C. and 70° C. as compared to the microcapsules of Example 1.

What is claimed is:

1. A process for forming microcapsules having discrete capsule walls comprising the steps of:

forming an emulsion of an oily core material phase in a continuous aqueous phase, said oily core material phase including an isocyanatoacrylate, or activated acrylate pre-wall reactant which reacts with said aqueous phase to form a pre-wall material around said oily core material phase; and enwrapping particles of said oily core material phase in an amine-formaldehyde condensation product produced by in situ condensation of an amine and formaldehyde.

2. The process according to claim 1 wherein said amine is melamine.

3. The process according to claim 1 wherein said amine is urea.

4. The process according to claim 1 wherein said pre-wall reactant is a compound of the formula (VI):

$$(CH_2=CH-\underset{\underset{O}{\|}}{C}-O)_m-R^1-(NCO)_n; \quad (VI)$$

wherein $R^1$ is an alkylene group, an arylene group, an arylenealkylene group, or a polyether group; and wherein m and n independently represent 1, 2 or 3.

5. The process according to claim 4 wherein said reactant is isocyanatoethylacrylate, isocyanatoethylmethacrylate or a condensate of 2-hydroxyethyl(meth)acrylate with a polyisocyanate.

6. The process according to claim 1 wherein said oily core material phase further comprises a diisocyanate or polyisocyanate pre-wall reactant in addition to said isocyanatoacrylate pre-wall reactant, said diisocyanate or polyisocyanate pre-wall reactant being capable of reacting with the water of said aqueous phase to form a polyurea network around said oily core material phase.

7. The process according to claim 6 wherein said oily core material phase or said aqueous phase additionally includes a catalyst for improving the reaction rate between said diisocyanate or polyisocyanate reactant with water.

8. The process according to claim 7 wherein said catalyst comprises dibutyltin dilaurate or diacetate.

9. The process according to claim 6 wherein said aqueous phase includes methylated polygalacturonic acid and sulfonated polystyrene.

10. A process for forming microcapsulates having discrete capsule walls comprising the steps:

forming an emulsion of an oily core material phase in a continuous aqueous phase, said oily core material phase including a cyanoacrylate pre-wall reactant which reacts with said aqueous phase to form a pre-wall material around said oily core material phase; and enwrapping particles of said oily core material phase in an amine-formaldehyde condensation product produced by in situ condensation of an amine and formaldehyde.

11. The process according to claim 10 wherein said amine is melamine.

12. The process according to claim 10 wherein said amine is urea.

* * * * *